UNITED STATES PATENT OFFICE.

ROGER ADAMS AND OLIVER KAMM, OF URBANA, ILLINOIS, ASSIGNORS TO THE ABBOTT LABORATORIES, OF CHICAGO, ILLINOIS, A CORPORATION OF ILLINOIS.

β-BROMOETHYL P-NITRO-BENZOATE.

1,260,289. Specification of Letters Patent. Patented Mar. 26, 1918.

No Drawing. Application filed December 21, 1917. Serial No. 208,210.

*To all whom it may concern:*

Be it known that we, ROGER ADAMS and OLIVER KAMM, both citizens of the United States, residing at Urbana, in the county of Champaign and State of Illinois, have invented certain new and useful Improvements in β-Bromoethyl P-Nitro-Benzoate, of which the following is a specification.

Our invention relates to improvements in a new chemical product which is of particular service when serving as an intermediate in the manufacture of novocain.

The principal object of our invention is to provide a new chemical product, β-bromoethyl ester of p-nitrobenzoic acid, heretofore unknown, and which, among other uses, may be employed to advantage in the manufacture of novocain.

The new product, β-bromoethyl ester of p-nitrobenzoic acid, which has the formula

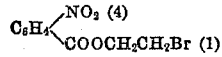

may be obtained by heating a salt of p-nitrobenzoic acid with an excess of ethylene bromid preferably in the presence of an amin or of finely divided copper as a catalyst.

*Example.*

A mixture of 15 grams of the dry sodium salt of p-nitrobenzoic acid, 75 grams of ethylene bromid, and ½ to 1 cc. of diethyl amin, is heated in a sealed tube at a temperature of approximately 140° C. for five hours. The reaction mixture is neutralized with alkali and then steam distilled in order to remove the excess of ethylene bromid, the β-bromoethyl ester of p-nitrobenzoic acid remaining behind as a yellow oil. It is contaminated with a small quantity of the di-p-nitrobenzoic acid ester of ethylene glycol, from which it may be separated by means of a suitable solvent, as for example with ether. Both products may be further purified by crystallization from alcohol. The β-bromoethyl ester of p-nitrobenzoic acid when purified in this manner is found to melt at 51° to 52° C. The yield of crude product is approximately 15 grams.

*Analysis.*

Weight of substance _____ 0.2382 grams,
Weight of AgBr _____ 0.1653 grams,
Found for $C_9H_8O_4NBr$ _____ Br, 29.5%
Calculated for $C_9H_8O_4NBr$ __ Br, 29.2%

The yield of di-p-nitrobenzoic ester of ethylene glycol is 4 grams, and its melting point 144° to 145° C.

The β-bromoethyl ester has been further identified by its conversion into novocain according to the following transformations:

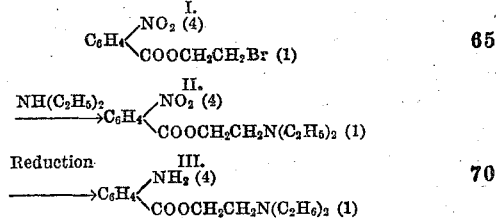

The novocain base (III) was found to melt at 60° C., while its monohydrochlorid melted at 155° C., thus demonstrating definitely the structure of the new compound.

We claim—

1. As a new article of manufacture, β-bromoethyl ester of p-nitrobenzoic acid.

2. As a new article of manufacture, β-bromoethyl ester of p-nitrobenzoic acid having the formula

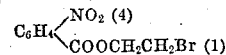

which is a cream colored solid melting at 51° to 52° C.

ROGER ADAMS.
OLIVER KAMM.